Dec. 14, 1954    J. W. GIFFEN    2,696,699
GLASS FORMING
Filed Feb. 8, 1952
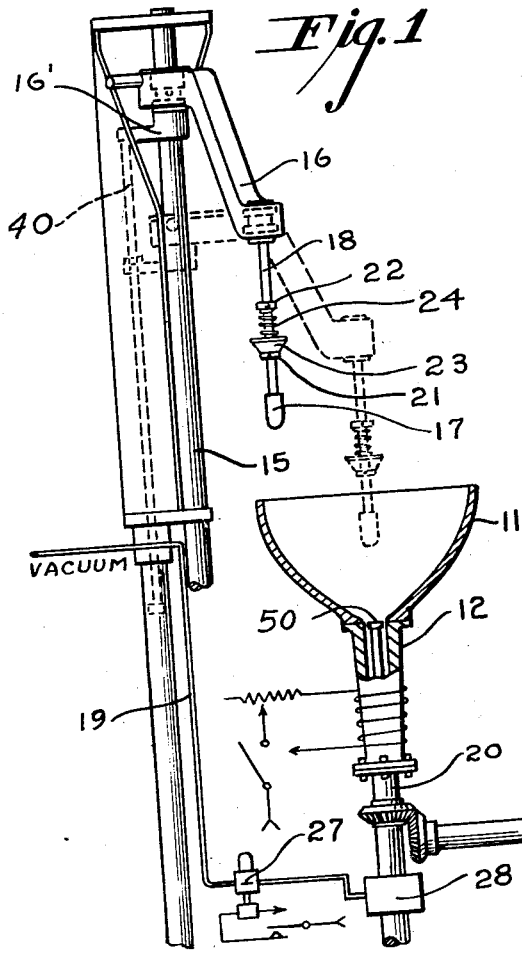
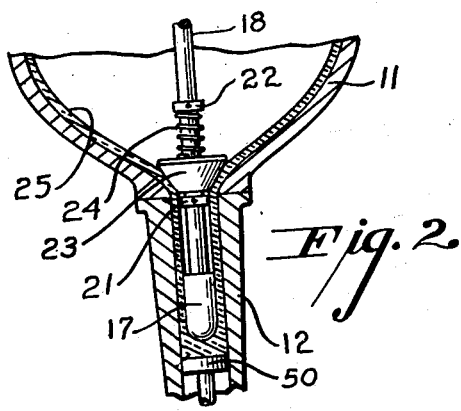
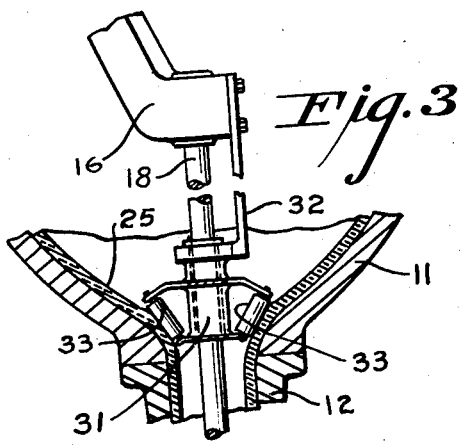
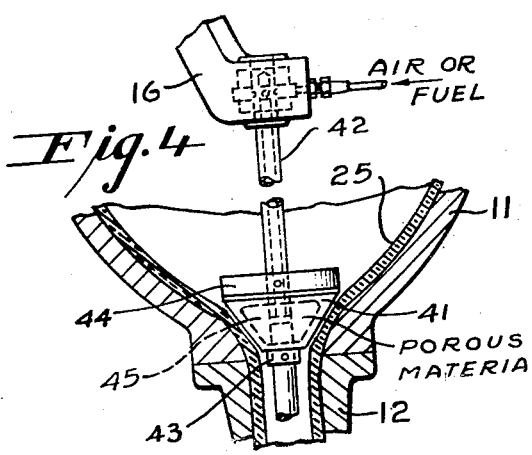
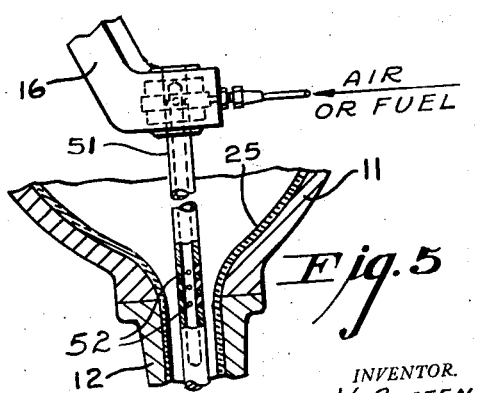
INVENTOR.
JAMES W. GIFFEN
BY
ATTORNEY.

United States Patent Office 2,696,699
Patented Dec. 14, 1954

2,696,699

GLASS FORMING

James W. Giffen, Corning, N. Y., assignor to Corning Glass Works, Corning, N. Y., a corporation of New York Application February 8, 1952, Serial No. 270,647

18 Claims. (Cl. 49—29)

The present invention relates to the fabrication of tubulated glass articles such as funnel tubes and television tube blanks of funnel-tube configuration, and may be considered as an improvement on the method and apparatus disclosed in my co-pending application S. N. 107,945 filed August 1, 1949, now Patent No. 2,662,346.

In accordance with the invention described in the aforesaid application, a tubulated glass article can be produced as an integral unit in a single operation by fabricating the article with the aid of centrifugal action. In the practice of that invention, a charge of molten glass is deposited in a hollow mold provided with a tubular portion, and the mold is rotated about the axis of its tubular portion to centrifugally distribute molten glass over the walls thereof. Advantageously the mold is arranged with its tubular portion vertical, and the glass charge is initially positioned over the mouth of the tubular portion. A differential pressure, preferably obtained at least in part by the creation of a negative pressure within the tubular portion, is applied to the glass charge to force a controlled amount of molten glass into the tubular portion for formation of the desired tubulation. A glassworking tool referred to as a distributor is advantageously also introduced into the tubular portion to effect annular extrusion and distribution of the glass forced thereinto desirably in cooperation with a valve which occupies such tubular portion and is so withdrawn as to subject the glass during its advancement therethrough in tubular form lengthwise along the wall thereof, to a yieldingly opposing pressure.

Tubulated funnels for use in the production of television picture tube envelopes require careful control of wall thickness in the area of juncture of the funnel and its tubulation, since if the wall thickness in such area becomes excessive, the electron beam clearance will be inadequate. While tubulated funnels satisfactory for such purpose can be produced by the procedure described in my co-pending application, such operation requires excessive care and also requires that low viscosity glass be delivered to the mold and that the mold be rotated at the necessary speed to stretch or thin out the glass in the funnel-tubulation junction area entirely by centrifugal action as required for proper beam clearance. Provision can readily be made for obtaining the necessary mold speed to attain this object for a given glass viscosity, but the continued maintenance of the required glass viscosity is more difficult and presents a greater problem.

According to the present invention, this difficulty can be substantially mitigated and a greater latitude of glass viscosity variation can be tolerated by providing, advantageously in association with the distributor, a sizing tool for sufficiently thinning the funnel-tubulation junction wall area while the funnel tube is being centrifugally completed and while the glass in such area is still soft. If desired such sizing tool can be made of graphite or other poor heat conducting refractory to reduce the danger of producing checks in the glass, or it may be made of a porous material and compressed air or other suitable gaseous fluid under pressure employed to pneumatically press the glass in such area. The application of additional heat to such area may be utilized in conjunction with the sizing tool to assist the desired thinning of the glass therein. In adidtion, the air or other gaseous fluid under pressure may be directed toward the glass in such area in directions which pneumatically aid the centrifugal action in thinning out the glass.

Various forms of the invention are shown in the accompanying drawing, in which:

Fig. 1 is a sectional elevation of a mold suitable for centrifugally forming a tubulated article in accordance with the invention and having an associated distributor and distributor-operating mechanism, such as shown in my co-pending application, with the distributor shaft equipped with a sizing tool.

Fig. 2 is a fragmentary sectional view, on an enlarged scale, of the mold, distributor and sizing tool shown in Fig. 1, with the sizing tool shown engaging an article that has been formed in the mold.

Fig. 3 is a fragmentary sectional view similar to Fig. 2 showing an alternative type of sizing tool.

Fig. 4 is a fragmentary sectional view similar to Fig. 2 showing another type of sizing tool.

Fig. 5 is a fragmentary sectional view similar to Fig. 4, but showing a still further type of sizing tool.

Referring to the drawing in detail, a mold 11 having a tubular portion 12 is illustrated as adapted for rotation about its vertical axis by means of a suitably driven hollow supporting shaft 20. A vacuum line 19, containing a magnetic valve 27, is shown connected with a stuffing box 28 in communication with the bore of shaft 20, for connecting a vacuum source to the bore of mold portion 12.

Arranged alongside mold 11 is a support column 15 upon which is slidably arranged an arm 16. Rotatably suspended from the free end of arm 16 is a shaft 18 carrying at its bottom end a distributor 17 (Figs. 1 and 2). A bracket 16' coupled to arm 16 is secured to the top end of an actuator rod 40 by means of which the distributor 17 may be moved into and out of the bore of the tubular portion 12 of the mold to form a tubular article by annular extrusion of glass in cooperation with retractable valve 50, as fully taught in my co-pending application.

In accordance with the present invention, there is arranged on distributor shaft 18, between two fixed collars 21 and 22, a sizing tool 23 resiliently held against collar 21 by a spring 24. The location of collar 21 is such that it permits tool 23 to be brought near enough to the oppositely disposed mold wall surface to engage the inner wall surface of a funnel tube 25 in the area of funnel-tubulation juncture under compression of the spring 24 as the distributor 17 approaches its lowermost position within the bore of mold portion 12. Tool 23 is thereby enabled to press the glass in such area to limit its thickness to that which assures that a television picture tube made from the resulting funnel tube will have the required beam clearance tolerance. With this arrangement, since the shaft 18 is rotatably supported, the tool 23 carried thereby rotates therewith and with the centrifugally spinning glass so that the funnel-tubulation junction wall area is pressed solely by vertically applied pressure.

In the alternative structure illustrated in Fig. 3 the sizing tool comprises a spool 31 connected by a strap 32 to arm 16 and carrying a plurality of rollers 33 adapted to engage the glass just before the distributor 17 reaches its lowermost position so that the funnel-tubulation wall area is pressed the desired extent by the action of rollers 33 on the funnel tube 25 as it is being rotated.

In the form of structure illustrated in Fig. 4 the sizing tool 41 has the outer configuration of tool 23, but is made of a porous material and is provided with an internal cavity 45; and distributor shaft 42 which may be rotatably suspended from arm 16, is hollow. As shown, tool 41 is so located on distributor shaft 42 between fixed collars 43 and 44 that it barely touches the glass as the distributor reaches its lowermost position.

A gaseous fluid under pressure from a suitable supply source, such for example as a compressed air supply line, is fed through the bore of shaft 42 to the cavity 45 and thence through the pores of the wall of tool 41. Pressure is thereby exerted against the inner surface of funnel tube 25 to effect thinning out of the funnel-tubulation wall area.

If desired, such gaseous fluid may be supplied under pressure at a sufficiently high temperature so that advantage can also be taken of its heat in accomplishing the desired thinning of the funnel-tube wall. Alternatively, a suitable gaseous fuel may be supplied under sufficient pressure for burning in situ in tool 41, the pores of which in such case are designed to most efficiently burn such fuel, that the resulting combustion gases themselves exert the desired pneumatic pressure against the funnel-tubulation junction wall area.

In the structure illustrated in Fig. 5 the distributor shaft 51 is also hollow and is provided with wall perforations 52, which however are slanted so as to direct the gaseous fluid under pressure, such as air or combustion gases, toward and upwardly against the funnel-tubulation junction wall area to aid centrifugal action in moving glass out of such area to sufficiently thin out the wall of the funnel tube.

What is claimed is:

1. The method of forming a tubulated hollow glass article within a mold having a hollow portion and a communicating tubular portion which includes rotating the mold about the axis of its tubular portion to centrifugally distribute part of a charge of molten glass over the wall of the hollow portion of such mold, applying pressure to glass of the charge occupying the tubular portion of the mold to impart tubular form thereto, and subjecting the resulting article while it is still being rotated and is still workable from its heat of formation to pressure localized on its inner surface toward its opposite outer surface in the area of juncture of the tubulation and the hollow part thereof to effect reduction of the wall thickness only in such area.

2. A method such as defined by claim 1 wherein the application of pressure to such inner surface area is effected with a forming tool.

3. A method such as defined by claim 1 wherein the application of pressure to such inner surface area is effected with rollers.

4. A method according to claim 1 wherein the application of pressure to such inner surface area is effected by a gaseous fluid under pressure.

5. A method as defined in claim 4, wherein the application of the gaseous fluid is in the general direction of the movement of the glass under centrifugal action.

6. A method such as defined by claim 1 wherein the application of pressure to such inner surface area is aided by directing additional heat toward the glass article at such inner surface area.

7. A glass-forming apparatus which includes a mold having a cavity of generally funnel-tube configuration, means for rotating the mold about the axis of its tubular portion to centrifugally distribute molten glass over the walls of the funnel and tubular portions of such cavity, means for assisting centrifugal action in the distribution of glass in tubular form within the tubular portion of the mold, and means for locally applying pressure solely to the area of juncture of the funnel and the tubulation of a funnel-tube formed in such mold to effect a reduction in thickness only of the wall thereof in such area.

8. Apparatus such as defined by claim 7 wherein the pressure-applying means comprises on element adapted for rolling engagement with the glass.

9. Apparatus such as defined by claim 7 wherein the pressure-applying means comprises facilities for directing a gaseous fluid under pressure against such area.

10. Apparatus such as defined by claim 9 wherein the pressure-applying means comprises a tool of porous material.

11. Apparatus such as defined by claim 7 which includes facilities for directing additional heat toward the glass of such area.

12. A glass-working apparatus, which includes a mold of generally funnel-tube configuration, means for rotating said mold about a vertical axis passing therethrough to centrifugally distribute glass over the funnel wall surface area thereof, a movable support arranged above said mold, a glass distributor depending from said support adapted for movement through the funnel portion of the mold into the tube portion thereof to aid in a desired distribution of glass over the surface area of the tubular portion of the mold wall, and means movable relative to said distributor to apply pressure to the glass in the area of juncture of said funnel and tube mold wall surfaces to aid centrifugal action in displacing glass therefrom.

13. An apparatus such as defined by claim 12 wherein said latter means is movable axially with respect to said support.

14. The method which comprises supplying a charge of molten glass to the juncture of the funnel-forming cavity and of the depending tube-forming cavity of a vertically disposed funnel-tube mold, rotating the mold about the tube cavity axis to concurrently centrifugally form a funnel upwardly from the charge in the funnel cavity against the action of gravity and a tube integral therewith downardly from the charge in the tube cavity aided by gravity, mechanically assisting centrifugal action in formation of the tube, and working the inner surface of the so formed funnel-tube solely in the area of juncture of its funnel and tube.

15. The method of forming a tubulated hollow glass article within a mold having a hollow portion and a communicating tubular portion which includes rotating the mold about the axis of its tubular portion to centrifugally distribute part of a charge of molten glass over the wall of the hollow portion of such mold, applying pressure to glass of the charge within the tubular portion of the mold in a direction co-extensive with the tubular portion axis to impart tubular form to glass therein and simultaneously directing additional heat into the resulting article solely toward the entire area of juncture of the tubulation and the hollow part thereof to aid centrifugal action in the distribution of glass in such area.

16. A method as defined in claim 15, wherein the additional heat is applied in the form of a gaseous fluid under pressure at an elevated temperature against the inner surface of the article at such area.

17. A method such as defined by claim 16, wherein such fluid is applied in the general direction of the movement of the glass under the centrifugal action.

18. The method of forming a tubulated hollow glass article, which includes depositing a molten glass charge within a mold having a hollow portion and a communicating tubular portion with such glass charge arranged across the inner end of such tubular portion, rotating the mold about the axis of its tubular portion to centrifugally distribute part of the glass charge over the wall of the hollow portion of such mold, applying pressure to all of that portion of the charge inward a predetermined distance from the wall of the tubular portion of such mold solely in a direction to advance it from one end towards the opposite end of such tubular portion in order to displace glass thereinto, while subjecting a similar but opposite surface area of the charge to a yieldingly opposing pressure so as to laterally extrude glass therefrom in tubular form along the tubular wall, and simultaneously directing additional heat into the resulting article solely toward the entire area of juncture of the tubulation and the hollow part thereof to aid centrifugal action in the further distribution of glass in such area.

References Cited in the file of this patent

UNITED STATES PATENTS

| Number | Name | Date |
|---|---|---|
| 960,587 | Sanford | June 7, 1910 |
| 1,721,983 | Bailey | July 23, 1929 |
| 1,859,957 | Canfield | May 24, 1932 |
| 2,198,750 | Winder | Apr. 30, 1940 |
| 2,374,269 | Breadner et al. | Apr. 24, 1945 |
| 2,475,915 | Orr | July 12, 1949 |

FOREIGN PATENTS

| Number | Country | Date |
|---|---|---|
| 23,348-29 | Australia | Oct. 20, 1930 |
| 566,519 | Great Britain | Jan. 2, 1945 |